United States Patent Office 2,979,160
Patented Apr. 11, 1961

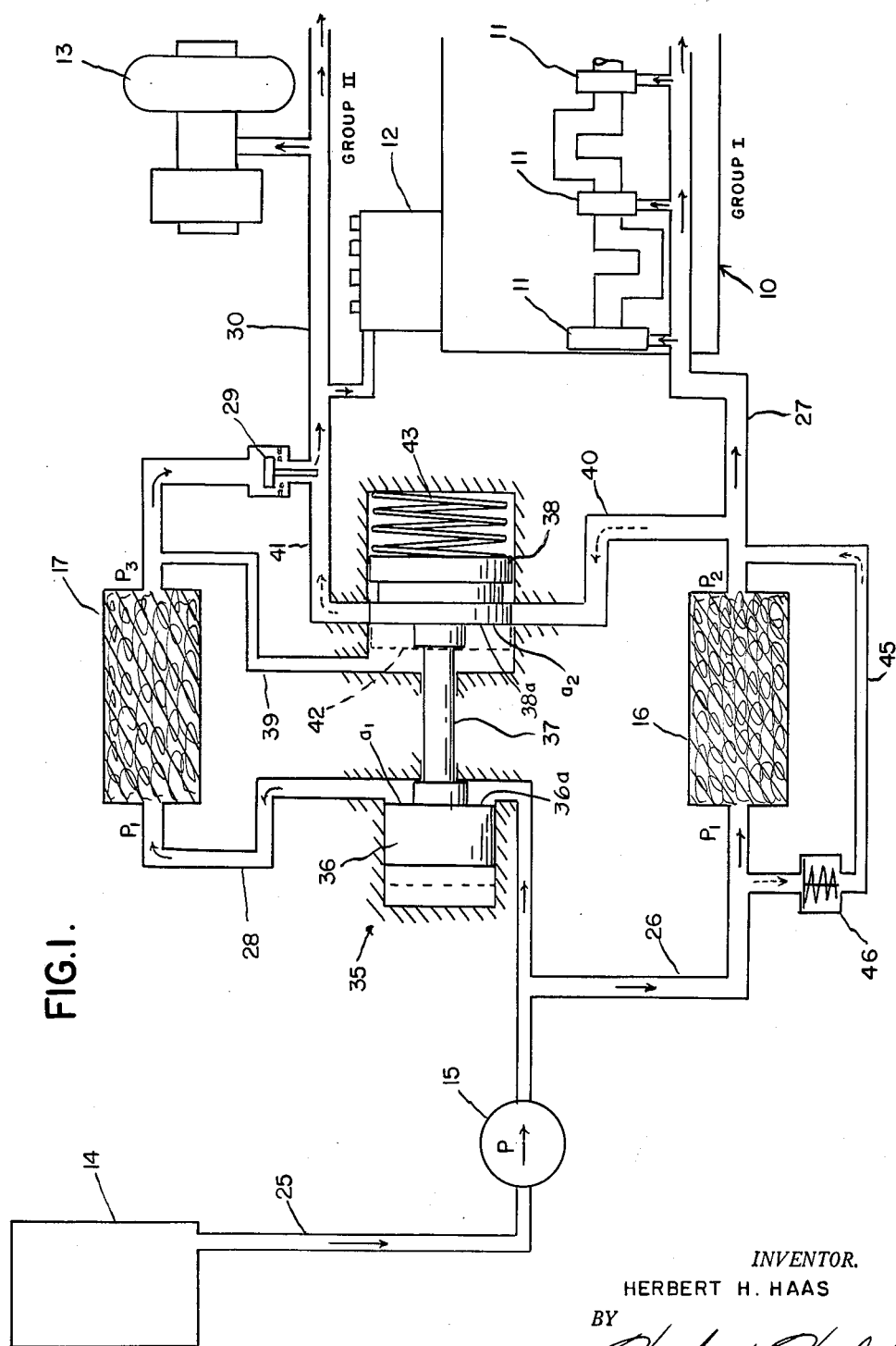

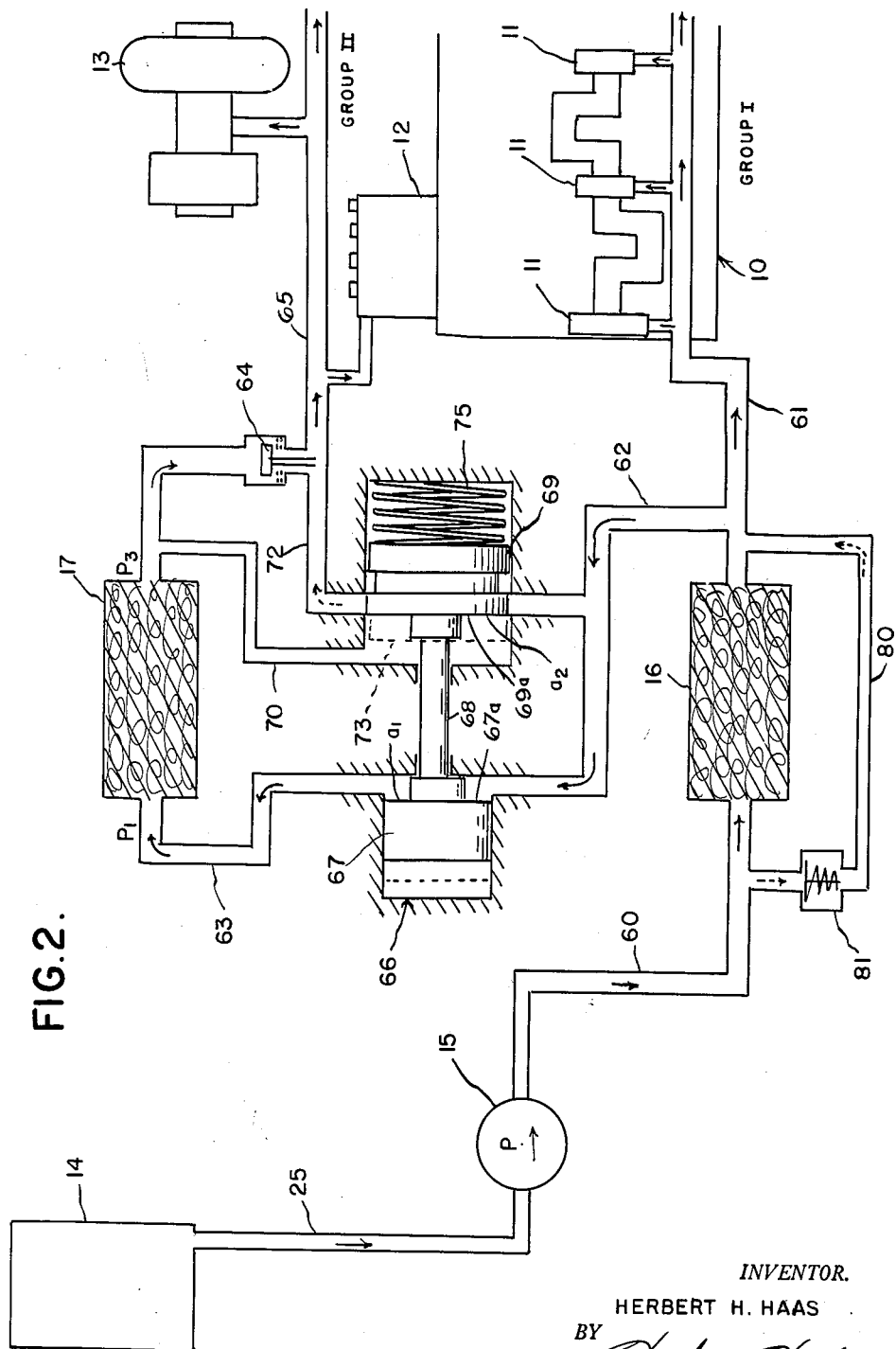

2,979,160
LUBRICATION SYSTEM

Herbert H. Haas, Royal Oak, Mich., assignor, by mesne assignments, to Continental Motors Corporation, Muskegon, Mich., a corporation of Virginia Filed Nov. 5, 1956, Ser. No. 620,334

6 Claims. (Cl. 184—6)

My invention relates to lubrication systems for internal combustion engines, and more particularly to a lubrication system including independent coarse and fine filtration systems and having means for serving the fine filtration system with oil from the coarse filtration system.

Many internal combustion engines include a plurality of groups of lubricated components in which different groups require different degrees of filtered oil. An example might be an engine having one group of components such as crankshaft main bearings and gears not requiring the fine oil filtration necessary for lubricating another group of components such as fuel injection pumps and exhaust turbines. In fact, it would be undesirable to provide fine filtration for the first group since it uses the major part of the available lubricating oil flow and any fine filter would necessarily be excessively large and would become rapidly clogged, requiring frequent replacement. In such a case, a filter of high capacity and coarse filtration for serving the first group and a second filter of fine filtration for serving the second group may be arranged either in series or in parallel. However, the fine filter will accumulate all particles of the fine size when arranged in series, and particles of both coarse and fine size when arranged in parallel, in either case the fine filter generally needing more frequent changing than the coarse filter. In some cases, such as military vehicle application, it may be impossible to provide for adequate maintenance. The usual type of oil bypass utilized permits unfiltered oil to be supplied to engine components when the filter becomes clogged, and for obvious reasons this is an undesirable situation, especially in expensive, high tolerance components such as injection pumps and turbines.

An object of the present invention is to improve engine oil lubrication systems by providing varying degrees of filtration in combination with bypass feature for insuring maximum possible filtration under any and all conditions.

Another object of the invention is to construct an improved lubrication oil filtration system by providing for multiple degrees of filtration to different engine components.

For a more complete understanding of my invention, reference may be had to the accompanying drawings, illustrating diagrammatically two preferred engine oil lubricating systems incorporating a preferred embodiment of my invention, in which like characters refer to like parts throughout the several views and in which:

Fig. 1 illustrates a diagrammatic view of a parallel filter arrangement, and

Fig. 2 illustrates a diagrammatic view of a series filter arrangement.

An internal combustion engine 10 is indicated as having two groups of components requiring lubrication. The first group is represented diagrammatically by main crankshaft bearings 11 and utilizes the major part of the available lubricating oil flow but requiring only relatively coarse filtration, such as will preferably eliminate foreign particles of approximately 50 to 60 microns in size. The second group is represented by a fuel injection pump 12 and an exhaust gas turbine 13 and utilizes a lesser part of the oil flow but requires a relatively high degree of filtration, such as will preferably eliminate foreign particles of approximately 10 to 20 microns in size.

The engine oil lubrication system preferably includes some type of reservoir 14, a pump 15, and a pair of filters 16 and 17 arranged either in parallel as illustrated in Fig. 1 or in series as indicated in Fig. 2. The filter 16 is preferably fine enough to trap foreign particles of approximately 50 to 60 microns and larger in size in the oil supplied to the engine components in the first group; the filter 17 is preferably fine enough to trap foreign particles of approximately 10 to 20 microns and larger in size in the oil supplied to the engine components in the second group, such as injector 12 and turbine 13.

It will be noted that in the parallel system of Fig. 1, the fine filter 17 in trapping particles larger than 10 to 20 microns can become clogged and require replacement more often than when the larger particles are first eliminated by the coarse filter 17 as they are in the system of Fig. 2. If replacement of the clogged fine filter is postponed or neglected, provisions are made in both systems so that at least oil from the coarse filter will be made available for use in the second group of engine components.

It should be noted that oil flow to and from the various components of the lubricating system may be through pipes, channels, passages, or any desirable means, but in the following description, passages will be discussed. Also, the flow indicated is only a preferred embodiment of the principles of the invention.

Referring first to the parallel system of Fig. 1:

Oil from the reservoir 14 flows through a passage 25 to the pump 15 and is then directed through a passage 26 to the coarse filter 16 and from the filter 16 through a passage 27 to the first group of engine components. Normally, oil flows also through a passage 28 to the fine filter 17 and then through a non-return normally open valve 29 of any preferred construction, shown in the open position, into a passage 30 leading to the second group of engine components.

Inlet and outlet pressures of the filter 16 are indicated respectively by the reference characters $p_1$ and $p_2$, and for purposes of discussion, it will be assumed that the maximum allowable pressure drop $\Delta p$ across this filter 16 is about 30 p.s.i.; that is, $p_1-p_2=\Delta p=30$ p.s.i. (max.). Inlet and outlet pressures of the filter 17 are indicated respectively by $p_1$ and $p_3$, and again for purposes of discussion the maximum allowable pressure drop $\Delta p'$ across this filter 17 is about 15 p.s.i.; that is, $p_1-p_3=\Delta p'=15$ p.s.i. (max.).

A pressure responsive instrumentality 35 of any desirable construction, preferably comprising a piston 36 having a surface 36a of an effective area $a_1$, in communication with filter inlet pressure $p_1$ and connected by any means such as a shaft 37 to a second piston 38 having a surface 38a of an effective area $a_2$ in communication through a passage 39 with the fine filter outlet pressure $p_3$. The piston 38 is adapted to selectively open communication between the passages 27 and 30 through respective passages 40 and 41 when the piston surface 38a is in the position indicated by the dotted line 42, the oil then passing around the annular groove 38b. When the piston is in the solid line position shown, it closes communication between the passages 40 and 41.

A spring 43 is provided which tends to move the pistons to the dotted line position and preferably adds but little to the pressure $p_1$ acting on the surface 36a of the piston 36, and for purposes of discussion may be ignored.

The piston areas $a_1$ and $a_2$ are selected so that when $\Delta p'$ is less than 15 p.s.i.; that is, when the fine filter is not clogged beyond the maximum allowable degree, the pistons 36 and 38 remain in the position shown in the drawing. In other terms, when $\Delta p' < 15$ p.s.i., $a_1 \cdot p_1 < a_2 \cdot p_3$ and the piston 38 closes communication between the passages 41 and 40 respectively connected with the outlets of the fine and coarse filtration systems. This is the normal operating condition of the lubrication oil system.

As the fine filter 17 becomes more and more clogged with dirt and other particles, the pressure drop $\Delta p'$ from $p_1$ to $p_3$ increases, until when $\Delta p'$ becomes greater than 15 p.s.i., the pressure on the surface 36a increases relative to the pressure on the surface 38a to an extent such that the pistons 36 and 38 are forced to the dotted line position to the left, the piston 38 opening communication between the passages 41 and 40 respectively connected with the outlets of the fine and coarse filtration systems. Oil from the coarse filter 16 will then flow directly into the passage 30 to the second group of engine components. Since $p_2$ is greater than $p_3$, the valve 29 will close, preventing backflow of oil from the coarse filter through the fine filter.

In case the coarse filter 16 becomes so clogged that $\Delta p > 30$ p.s.i., a bypass passage 45 is provided having a safety valve 46 which will then open, bypassing unfiltered oil around the filter 16, so that at no time will the engine be wholly deprived of lubricating oil.

Whenever the fine filter 17 is cleaned or replaced, the pressure drop $\Delta p'$ will decrease below 15 p.s.i., $a_1 \cdot p_1$ will decrease below $a_2 \cdot p_3$, and the pistons 36 and 38 will shift to the right to the position shown, closing the communication between the filter outlets through passages 40 and 41, the pressure $p_3$ will open the valve 29, and normal operating conditions will be restored.

Whenever the engine is stopped and oil pressure drops, the spring 43 will urge the pistons 36 and 38 to the bypassed position, insuring oil flow to the second group of components through the communicated passages 40 and 41 in case of failure or freezing of the pistons or clogging of the fine filter 17.

Referring now to the series system of Fig. 2:

Oil from the reservoir 14 flows through a passage 25 to the pump 15 and is then directed through a passage 60 to the coarse filter 16 and from the filter 16 through a passage 61 to the first group of engine components. Oil normally flows after passing through the coarse filters also through the passages 62 and 63 to the fine filter 17 and then through a non-return normally open valve 64 of any preferred construction to a passage 65 leading to the second group of engine components.

Inlet and outlet pressures of the filter 17 are indicated respectively by $p_1$ and $p_3$, and for purposes of discussion the maximum allowable pressure drop $\Delta p'$ across this filter 17 is about 15 p.s.i.; that is $p_1 - p_3 = \Delta p' = 15$ p.s.i. (max.).

A pressure responsive instrumentality 66 similar to the instrumentality 35 of Fig. 1 and comprising a piston 67 having a surface 67a of an effective area $a_1$, in communication with filter inlet pressure $p_1$ and connected by any means such as a shaft 68 to a second piston 69 having a surface 69a an effective area $a_2$ in communication through a passage 70 with the fine filter outlet pressure $p_3$. The piston 69 is adapted to selectively open communication between the passages 61 and 65 through respective passages 62 and 72 when the piston surface 67a is in the position indicated by the dotted line 73, the oil then passing around the annular groove 69b. When the piston is in the solid line position shown, it closes communication between the passages 62 and 72.

A spring 75 is provided which tends to move the pistons to the dotted line position and preferably adds but little to the pressure $p_1$ acting on the surface 67a of the piston 37, and for purposes of discussion may be ignored.

The piston areas $a_1$ and $a_2$ are selected so that when $\Delta p'$ is less than 15 p.s.i.; that is, when the fine filter 17 is not clogged beyond the maximum allowable degree, the pistons 67 and 69 remain in the position shown in the drawing. In other terms, when $\Delta p' < 15$ p.s.i., $a_1 \cdot p_1 < a_2 \cdot p_3$, and the piston 69 closes communication between the outlets of the fine and coarse filtration systems as in the parallel system of Fig. 1. This is the normal operating condition of the lubricating oil system.

As the fine filter 17 becomes more and more clogged with dirt and other particles, the pressure drop $\Delta p'$ from $p_1$ to $p_3$ increases, until when $\Delta p'$ becomes greater than 15 p.s.i., the pressure on the surface 67a increases relative to the pressure on the surface 69a to an extent such that the pistons 67 and 69 will shift to the left to the dotted line positions shown in the drawing; that is, when $\Delta p' < 15$ p.s.i., $a_1 \cdot p_1 > a_2 \cdot p_3$, and the pistons 67 and 69 are forced to the left, the piston 69 opening communication between the outlets of the fine and coarse filtration systems, again as in the parallel system of Fig. 1. Oil from the coarse filter 16 will then flow directly into the passage 65 to the second group of engine components. Since the pressure $p_3$ has dropped, the valve 64 will close due to the pressure of oil in passage 65, preventing backflow of oil from the coarse filter through the fine filter.

In case the coarse filter 16 becomes clogged, a bypass passage 80 is provided having a safety valve 81 which will then open, bypassing unfiltered oil around the filter 16, so that at no time will the engine be wholly deprived of lubricating oil.

Whenever the fine filter 17 is cleaned or replaced, the pressure drop $\Delta p'$ will decrease below 15 p.s.i., $a_1 \cdot p_1$ will decrease below $a_2 \cdot p_2$, and the pistons 67 and 69 will shift to the right, closing the filter outlet communication between passages 62 and 72, the pressure $p_3$ will open the valve 64, and normal operating conditions will be restored.

Whenever the engine is stopped and oil pressure drops, the spring 75 will urge the pistons 67 and 69 to the bypassed dotted line position, insuring oil flow to the second group of components through the passages 62 and 72 in case of failure or freezing of the pistons or clogging of the fine filter 17.

Although I have described two preferred embodiments of my invention, it will be apparent to one skilled in the art to which the invention pertains that various changes and modifications may be made therein without departing from the spirit of the invention or the scope of the appended claims.

I claim:

1. In an internal combustion engine having two sets of separate operating components respectively requiring lubrication by oil under pressure and filtered to different degrees, a lubrication system comprising a source of pressure oil supply, a fine filter and a coarse filter each having an oil inlet and an oil outlet, said fine filter being operable to effect a finer degree of oil filtration than said coarse filter, means connecting said inlets with said oil supply, means normally connecting said outlets respectively with said sets of separate operating engine components, and bypass means disposed intermediate said filters, normally closed means connecting the coarse filter outlet with the set of engine components which are normally connected with the fine filter outlet, means actuating said bypass means in response to an increase above a predetermined value of pressure differential between the fine filter inlet and outlet to openly connect said coarse filter outlet with the set of engine components normally connected with the fine filter outlet, and means actuating said bypass means in response to a decrease below said predetermined value of the aforesaid pressure differential to close the aforesaid connection of said coarse filter outlet with the set of engine components normally connected with the fine filter outlet.

2. The lubrication system as defined in claim 1 and in which said bypass means comprises a valve means connected intermediate said coarse filter outlet and the set of engine components normally connected with said fine filter outlet, and in which said actuating means comprises a pressure sensing means operably connected with said valve means and having open connections with the inlet and the outlet of said fine filter, said pressure sensing means being operable to open said valve only in response to the aforesaid increase of pressure differential between the inlet and the outlet of said fine filter.

3. The lubrication system as defined in claim 2 and including a second valve means connected intermediate the first valve means and the fine filter outlet, said second valve means being operable to close communication between the fine filter outlet and the set of engine components normally connected therewith, said second valve means being actuated in response to an increase in the oil pressure delivered to said set of engine components relative to the oil pressure at said fine filter outlet whereby to prevent reverse flow of oil through said fine filter when said first valve is open.

4. The lubrication system as defined in claim 1 and including means resiliently urging said bypass means to a position openly connecting said coarse filter outlet with the set of engine components normally connected with said fine filter outlet, said means being operable only in response to a predetermined decrease of pressure from said pressure oil supply.

5. The lubrication system as defined in claim 1 and in which said filters are normally connected in parallel, the inlets of said filters being openly connected to effect equal filter inlet pressures of both filters at all times.

6. The lubrication system as defined in claim 1 and in which said filters are normally connected in series, the inlet of said fine filter and the outlet of said coarse filter being openly connected to normally provide circulation through said fine filter of oil previously filtered through said coarse filter, the inlet pressure of said fine filter being normally equal to the outlet pressure of said coarse filter.

References Cited in the file of this patent

UNITED STATES PATENTS

| | | |
|---|---|---|
| 1,818,392 | Hans | Aug. 11, 1931 |
| 2,098,725 | Hurn | Nov. 9, 1937 |
| 2,302,552 | Johnson | Nov. 17, 1942 |
| 2,423,329 | Le Clair | July 1, 1947 |
| 2,747,744 | Gretzinger | May 29, 1956 |
| 2,748,949 | James | June 5, 1956 |

FOREIGN PATENTS

| | | |
|---|---|---|
| 118,713 | Australia | July 17, 1944 |
| 751,892 | Great Britain | July 4, 1956 |